(12) United States Patent
Shiell et al.

(10) Patent No.: US 8,655,029 B2
(45) Date of Patent: Feb. 18, 2014

(54) HASH-BASED FACE RECOGNITION SYSTEM

(75) Inventors: Derek Shiell, Los Angeles, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 123 days.

(21) Appl. No.: 13/443,624

(22) Filed: Apr. 10, 2012

(65) Prior Publication Data

US 2013/0266195 A1  Oct. 10, 2013

(51) Int. Cl.
*G06K 9/00* (2006.01)
(52) U.S. Cl.
USPC .......................................................... 382/118
(58) Field of Classification Search
USPC .......................................................... 382/118
See application file for complete search history.

(56) References Cited

U.S. PATENT DOCUMENTS

| | | | |
|---|---|---|---|
| 6,711,293 B1 * | 3/2004 | Lowe | 382/219 |
| 8,098,938 B1 * | 1/2012 | Buddemeier et al. | 382/207 |
| 8,200,025 B2 * | 6/2012 | Woodbeck | 382/224 |
| 8,254,697 B2 * | 8/2012 | Isard et al. | 382/209 |
| 8,306,366 B2 * | 11/2012 | Kwon et al. | 382/304 |
| 8,369,621 B2 * | 2/2013 | Nomura | 382/190 |
| 8,401,276 B1 * | 3/2013 | Choe et al. | 382/154 |
| 8,406,535 B2 * | 3/2013 | Chrysanthakopoulos | 382/225 |
| 2005/0105780 A1 * | 5/2005 | Ioffe | 382/118 |

OTHER PUBLICATIONS

Mian, A.S., et al., "Matching Tensors for Pose Invariant Automatic 3D Face Recognition", Proceedings of the 2005 IEEE Computer Society Conference on Computer Vision and Pattern Recognition.
Ozuysal, M., et al., "Fast Keypoint Recognition Using Random Ferns", IEEE Transactions on Pattern Analysis and Machine Intelligence, vol. 32, 2010.
Wu, Z, et al., "Scalable Face Image Retrieval with Identity-Based Quantization and Multi-Reference Re-ranking", IEEE Conference on Computer Vision and Pattern Recognition, Jun. 2010.
Ozuysal, M., et al., "Fast Keypoint Recognition in Ten Lines of Code", IEEE Conference on Computer Vision and Pattern Recognition, Jun. 2007.

* cited by examiner

*Primary Examiner* — Samir Ahmed

(57) ABSTRACT

In a face recognition system, overlapping patches are defined on a canonical face. Random clusters of pixel pairs are defined within each patch, and binary features are determined for each pixel pair by comparing their respective feature values. An inverted index hash table is constructed of the binary features. Similar binary features are then determined on a library of registrable samples of identified faces. A log probability of each registrable sample generating a binary feature from a corresponding cluster of pixel pairs at each specific patch location is determined and stored in the hash table. In a search phase, similar binary features are determined, and a hash key is determined for each binary feature. The log probabilities for each identity found in the hash table are summed for all clusters of pixel pairs and locations and sorted to find the high probability match.

18 Claims, 15 Drawing Sheets

Feature a: [patch k][fern 1][bin 1]
Feature b: [patch k][fern 2][bin 2]
Feature c: [patch k][fern 3][bin 3]

HASH-BASED FACE RECOGNITION SYSTEM

BACKGROUND

1. Field of Invention

The present invention generally relates to biometric identification. More specifically, the present invention relates to face recognition or identification verification purposes.

2. Description of Related Art

Biometrics refers to the use of intrinsic human traits for personal identification purposes. That is, a person may be identified by one or a combination of multiple different personal traits characteristic of that person. Examples of such personal traits are a fingerprint, a hand print (length and thickness of the fingers, size of the hand itself), a retina scan (pattern of blood vessels in the eye), an iris scan, a facial photograph, a blood vessel pattern (vein pattern), a voice print, a dynamic signature (the shape and time pattern for writing a signature), or a keystroke pattern (key entry timing).

Of particular interest are biometric identification techniques that use images for personal identification. The images may be of any of a number of biometric types. For example, the images used may be of finger prints, blood vessel patterns, iris scans, etc. Of particular interest, however is the use of facial photographs for deification verification. This topic relates to the field of computer vision.

In the field of computer vision, it is generally desirable that an image not only be captured, but that a computer is able to identify and label various features within the captured image. Basically, a goal of computer vision is for the computer to "understand" the content of a captured image.

Various approaches to identifying features within a captured image are known. Early approaches centered on the concept of identifying shapes. For example, if a goal was to identify a specific item, such as wrench or a type of wrench, then a library of the different types of acceptable wrenches (i.e. "true examples" defined as images of "true" wrenches) would be created. The outline shapes of the wrenches within these true examples would be stored, and a search for the acceptable shapes would be conducted on a captured image. This approach of shape searching was successful when one had an exhaustive library of acceptable shapes, the library was not overly large, and the subject of the captured images did not deviate from the predefined true shapes.

However for complex searches, such as searching an image for biometric identifiers that are prone to change, this exhaustive library approach is not practical. For example, a human face has definite characteristics, but does not have an easily definable number of shapes and/or appearances it may adopt. It is to be understood that the term appearance is herein used to refer to color and/or light differences across an object, as well as other surface/texture variances. The difficulties in understanding a human face becomes even more acute when one considers that it is prone to shape distortion and/or change in appearance within the normal course of human life due to changes in emotion, expression, speech, age, etc. It is self-apparent that compiling an exhaustive library of human faces and their many variations is a practical impossibility.

Recent developments in image recognition of objects that change their shape and appearance, such as a human face, are discussed in "Statistical Models of Appearance for Computer Vision", by T. F. Cootes and C. J. Taylor (hereinafter Cootes et al.), Imaging Science and Biomedical Engineering, University of Manchester, Manchester M13 9PT, U.K. email: t.cootes@man.ac.uk, http://www.isbe.man.ac.uk, Mar. 8, 2004, which is hereby incorporated in its entirety by reference.

Cootes et al. suggest that in order for a machine to be able to understand what it "sees", it must make use of models that describe and label the expected structure being imaged. In the past, model-based vision has been applied successfully to images of man-made objects, but their use has proven more difficult in interpreting images of natural subjects, which tend to be complex and variable. The main problem is the variability of the subject being examined. To be useful, a model needs to be specific, that is, it should represent only true examples of the modeled subject. To identify a variable object, however, the model needs to be general and represent any plausible true example of the class of object it represents. Recent developments have shown that this apparent contradiction can be handled by statistical models that can capture specific patterns of variability in shape and appearance. It has further been shown that these statistical models can be used directly in image interpretation. That is, they may be used to identify a specific example of a general object class within an image.

Another area of image recognition is feature detection, and its use in correspondence matching. Feature detection is used to correlate similar features of an object in different images. That is, if each of two images has a different view of a common object, feature detection permits one to identify the corresponding portions of the common object that are visible in the two images. Thus, given a first view of an object in a first image, one can look for, and identify, the same object in another image, even if the other image provides only a partial, or skewed, view of the same object.

Feature detection often relies on the use of feature points that can be uniquely identified and correlated in two, or more, images. The feature points are typically pixels (or point regions within an image) that are uniquely identifiable by a set of statistical characteristics determined from neighboring pixels within a defined neighborhood surrounding the feature point.

Correspondence matching (or the correspondence problem) refers to the matching of objects (or object features or feature points) common to two, or more, images. Correspondence matching tries to figure out which parts of a first image correspond to (i.e. are matched to) which parts of a second image, assuming that the second image was taken after the camera had moved, time had elapsed, and/or the pictured objects had moved. For example, the first image may be of a real-world scene taken from a first view angle with a first field of vision, FOV, and the second image may be of the same scene taken from a second view angle with a second FOV. Assuming that the first and second FOVs at least partially overlap, correspondence matching refers to the matching of common features points in the overlapped portions of the first and second images.

For example in FIG. 1, images 2, 4, 6 and 8 each provide partial, and overlapping, views of a building in a real-world scene, but none provide a full view of the entire building. However, by applying edge detection and indexing (i.e. identifying matching pairs of) feature points in the four partial images 2, 4, 6 and 8 that correlate to the same real feature point in the real-world scene, it is possible to identify corresponding features in the four partial images 2-8 and stitch together the four partial images (i.e. applying an image stitching tool) to create one composite image 10 of the entire building. In the present example, the four partial images 2-8 are taken from the same view angle, but this approach may be extended to images of a common scene that are taken from different view angles.

Feature detection may also be used to look for specific objects in image. For example, if one has a library of identifying features of a specific object, then one may search a test image for those identifying features in an effort to determine if an example of the specific object is present in the test image. When this is extended to multiple test images of a common scene taken from different view angles, it is possible to index, i.e. match or correlate, feature points from one image to the other.

It is an object of the present invention to provide a biometric identification system that provides for quick identification of a submitted test image.

It is another object of the present invention to provide a face recognition identification system that combines the use of statistical models to handle variations in an object class, with the simplicity of using feature points to correlate features of different image.

SUMMARY OF INVENTION

The above objects are met in a system and method of identifying, within an input test image, a specific item of an item class, the method including: (a) identifying a sample of the item class within the input test image, and aligning the identified sample to a canonical sample of the item class to create a fitted sample; (b) applying a first patch pattern onto the fitted sample; (c) applying a second patch pattern onto the fitted sample, the second patch pattern overlapping the first patch pattern; (d) computing binary features for select overlapping patches of the first and second patch patterns, each computed binary feature being based on a choice of pixel patterns; (e) creating a different hash key for each computed binary feature, the hash key being based on patch location in which the binary feature was computed and the choice of pixel patterns used in its computation and the binary value of the computed binary feature; (f) using the created hash keys to access their corresponding entries in a hash table, each entry including identification (ID) information identifying an identity of a previously registered specific sample of the item class and the corresponding log probability of that identity generating a binary feature similar to the computed binary feature of the hash key at the specific patch location; (g) summing the log probabilities of each identity found in the hash table using the created hash keys, sorting the found identifies by cumulative log probabilities to find the highest probability match; (h) deeming the identity having the highest probability match to most closely match the specific item.

Preferably in step (a), the fitted sample has a known size and shape. Also preferably, each patch within the first and second patch patterns has predefined pixel pair clusters for establishing the binary feature. In this case, the pixel pairs within the pixel pairs clusters may be defined randomly on a corresponding patch on the canonical sample.

Also preferably, each patch within the first and second patch patterns have randomly defined pixel pair clusters for establishing the binary feature.

Additionally, the first patch pattern may fully span the fitted sample, and the second patch pattern while may not span the entirety of the fitted sample.

Also in step (c), individual patches of the second patch pattern may be misaligned with individual patches the first patch pattern.

Preferably in step (c), the first and second patch patterns have respective patches of uniform size and shape continuously distributed throughout their respective patch pattern.

Furthermore, the second patch pattern may be comprised of patches of identical shape and size as the patches of the first patch pattern. Alternatively, the second patch pattern may have more patches than the first patch pattern, and the patches of the second patch pattern may have the same shape as, and be smaller than, the patches of the first patch pattern. Further alternatively, the second patch pattern may be comprised of patches of different shape than the patches of the first patch pattern.

It is further put forth that in step (d), the choice of pixel patterns may include a random pixel pattern. Alternatively in step (d), the choice of pixel patterns may include predefined pixel patterns defined randomly on the canonical sample.

Furthermore in step (d), each computed binary feature may be based on a choice of feature characteristics, and the choice of feature characteristics may implemented as direct comparisons between pixel pairs (defined by the choice of pixel patterns) of one of a plurality of pixel characteristics, wherein the binary value assigned to each pixel of the pixel pair is indicative of which pixel had the greater value and which had the lesser value in the comparison.

In one embodiment, binary features may be computed for all patches of the first and second patch patterns.

In a preferred embodiment, the hash table is constructed by: (A) applying the first patch pattern onto the canonical sample; (B) applying the second patch pattern onto the canonical sample, the second patch pattern overlapping the first patch pattern; (C) defining a plurality of random pixel pair clusters for each patch in the first patch pattern and in the second patch pattern; (D) computing a separate binary feature for each pixel pair cluster; (E) defining the hash table using an inverted indexing scheme, wherein a hash key is computed for each computed binary feature based on the patch location in which the binary feature was computed and the pair cluster used in its computation and the binary value of the computed binary feature; (F) accessing a library of registrable samples of the item class, each registrable samples having a defined ID information identifying its identity, for each accessed registrable sample: (i) aligning the registrable sample to the canonical sample to create a registrable fitted sample; (ii) applying the first patch pattern onto the registrable fitted sample; (iii) applying the second patch pattern onto the fitted sample, the second patch pattern overlapping the first patch pattern; (iv) computing a separate binary feature for each of the random pixel pair clusters defined in step (C); (vi) computing a probability of the current registrable sample generating a binary feature from the pixel pair cluster at the current specific patch location; (vii) storing the probability and the identify of the current registrable sample at the hash table location corresponding to the current binary feature.

Preferably in this embodiment, the probability is a log probability.

In a preferred embodiment, the item class is a human face class.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
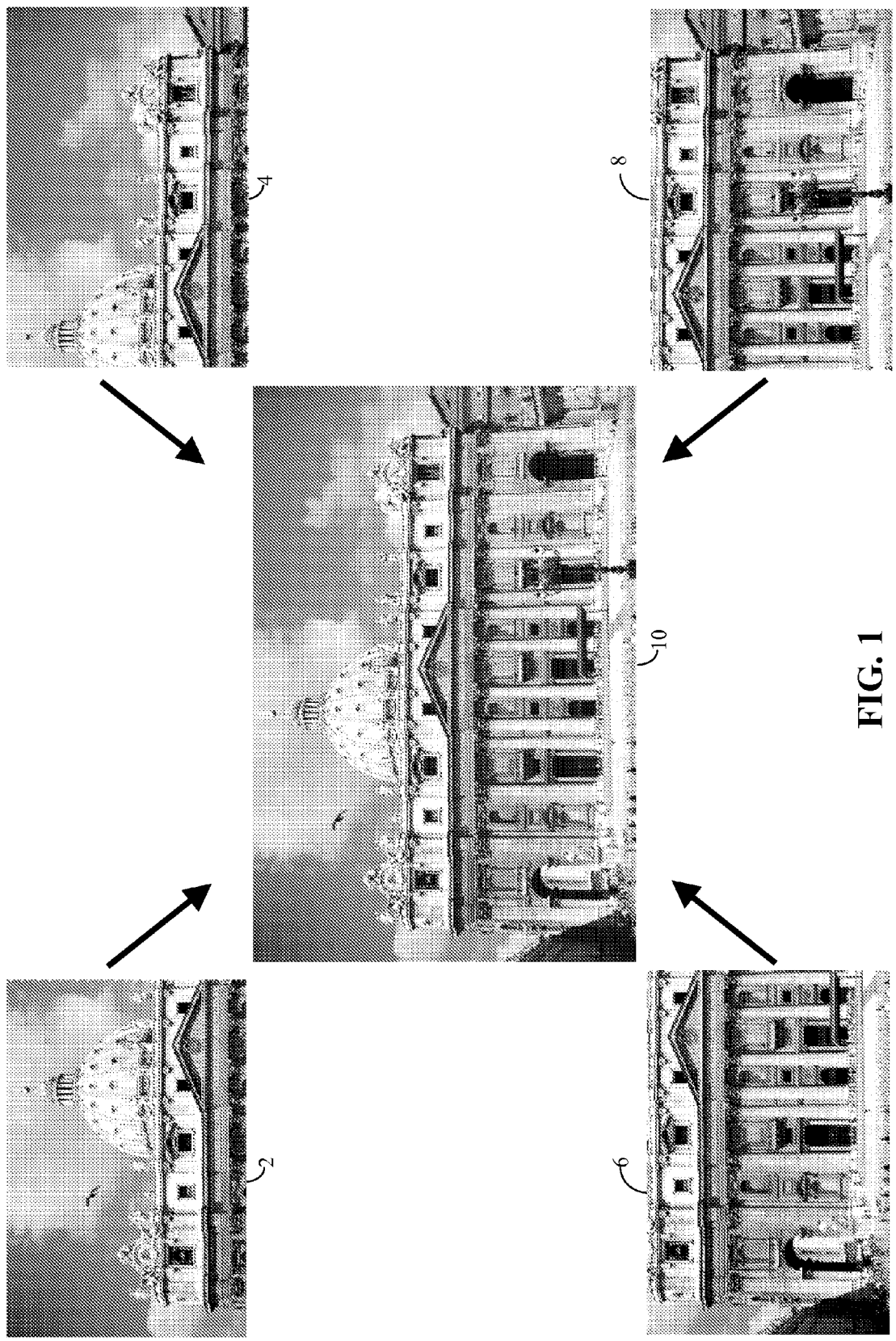
FIG. 1 illustrates the use of edge detection in feature detection and image stitching.

People have many distinctive and personal characteristics that distinguish one person from another. Some examples of these distinguishing characteristics are fingerprints, facial features, vein (or blood vessel) patterns in various parts of the body, voice points, etc. The use of one (or a combination of) such distinguishing characteristics, or traits, to identify (or to verify the identity of) someone is termed Biometrics.

Biometrics thus involves receiving a test sample of a biometric feature, such as a finger print, and comparing the test sample with a registry of known (i.e. pre-registered) samples in an effort to find a match. Typically, the registry is built by registering known individuals. Each registering individual submits a true sample of a specific biometric feature, which then becomes his registered sample and is identified with that individual. In this manner, the registered sample is known to correspond to a specific (i.e. registered) individual, and a person's identity can be confirmed by matching the person's newly submitted test sample to his/her registered sample.

In the typical biometric identification process, a submitted test sample of someone wishing to be identified as registered person is compared with a registry of registered samples. If a match is found, then the test sample is identified as corresponding to the registered person associated with matched registered sample. If the person is not already registered within the registry of biometric samples, then the process should reject the person as unknown and not verified. Thus, the biometric identification process should only identify (i.e. recognize) registered persons. Much research has been made into various methods of precisely matching a submitted test sample to a library of registered sample, and avoiding false positives (i.e. confirming a match in error).

Problems may arise when a test sample submitted for recognition is truly from a registered person, but the test sample is not identical to the registered person's registered sample due to various circumstances. For example, the testing device that acquires the test sample may not be as precise as (or may otherwise be different or provide a different/partial view as compared to) the device used to originally register the person. Variations may also be due to physiological changes in the registered person that cause his/her test sample to vary to some degree from the registered sample (i.e., the true sample previously used to register the person). In this case, the biometric algorithm should be flexible enough to allow for such variations, but still be sophisticated enough to avoid mistakenly verifying a person that is not in the registry.

Such sophisticated systems can be slow to process submitted test samples, which is a problem since biometric identification devices are often used to control access to specific buildings, rooms, devices, and/or information, and an unduly long delay in verification can significantly disrupt workflow. Biometric systems can be sped up by creating special searching algorithms based on the library of registered samples, themselves. Because theses special searching algorithms have search parameters specifically tailored to the registered samples, they can be made to execute faster than a general search mechanism. However, because these special search algorithms are tailor-made to the library of registered samples, they need to be reconstructed whenever the library of registered samples is changed. That is, if a new person is added to the registry (or a previously registered person is removed from the registry), a new tailor-made search algorithm needs to be constructed to reflect the current state of the registry, and the this new search algorithm then needs to be distributed to all biometric identification devices.

The present invention simplifies the biometrics process by creating a search engine based on the general category of item being search, rather than on the exhaustive library of registered samples. It is further emphasized that the present invention is not limited to biometric identification processes, but may be use in any image recognition application (i.e. where it is desirable to recognize a specific object within an image). Using a search engine based on a general category (i.e. object class), such as searching for matching finger prints, means that the present invention would be trained train on real-world examples of finger prints, but these real-world examples would not come from the registered persons.

An added benefit of the present method is that it may be applied to various types of search applications. That is, it may be used to identify specific items of a given object class, as long as it is trained using a general sample of the given object class. For illustration purposes, the present invention is described as applied to face recognition, but it is to be understood that it may be equally applied to other types of biometric identification features, such as for example, fingerprints, hand prints, a retina scans, iris scans, blood vessel patterns, etc.

The present invention combines the benefits of using statistical models of object classes to identify specific instances of a general object class, with the use of image feature points to correlate similar objects in multiple images. For example with reference to FIG. 2, when a person submits a test image 12 for face recognition, the test image may be first submitted to a face detection mechanism to assure that a test image does indeed contain sample of human face. The found face within test image 12 is then fitted to a model face (not shown) to create fitted face 14. The model face is based on a predefined statistical model of general features, and provides fitted face 14 with known locations of characteristic facial features, such as eye corners, nostrils, lip corners, etc.

Before proceeding, it may beneficial to discuss a preferred method of fitting the found face within test image 12 with a model face. The preferred method is based on statistical modeling, which defines the model face from a training library of general face samples.

To facilitate the application of statistical models in an object recognition application, subjects to be interpreted are typically separated into object classes (i.e. kind or type of object). This permits the statistical analysis to use prior knowledge of the characteristics of a particular object class to facilitate its identification and labeling, and even to overcome confusion caused by structural complexity, noise, or missing data.

Additionally, in order to facilitate further processing of identified and labeled subjects within a captured image, it is beneficial for the identified subject to be transformed into (i.e. be fitted onto) a "model" or "canonical" shape of the object class being sought. Preferably, this model, or canonical, shape would be of predefined shape and size, and have an inventory of labels identifying characteristic features at predefined locations within the predefined shape. For example, although the human face can vary widely, it can be conformed to a standard shape and size. Once conformed to the standard shape and size, the transformed face can then be further processed to determine its expression, its gaze direction, the individual to whom the face belongs, etc.

Figure 3:
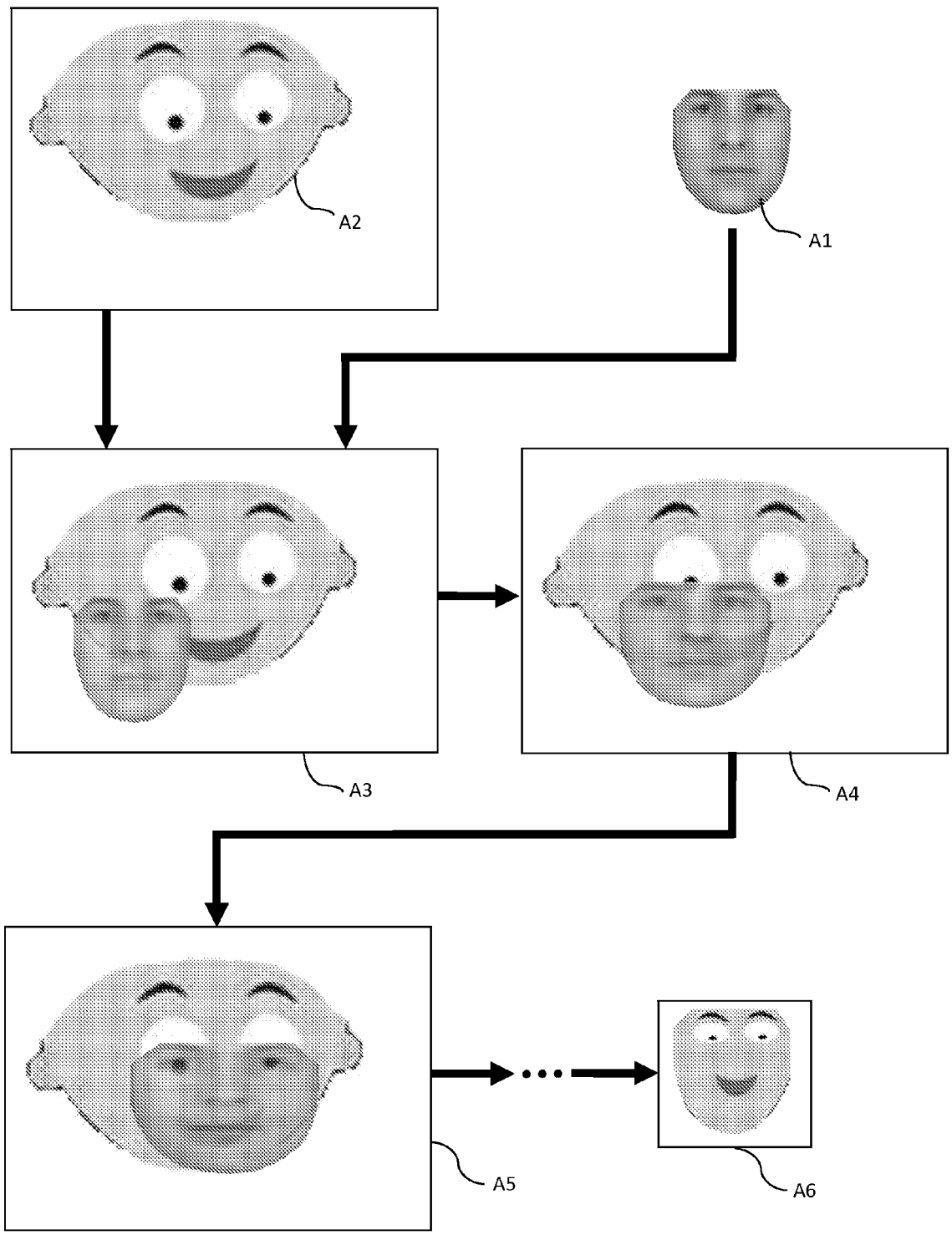
FIG. 3 shows an example of a fitting operation to fit a model face to an input test face.

A method that uses this type of alignment is the active shape model. With reference to FIG. 3, the active shape model uses a predefined model face A1 and a list of predefined deformation parameters, each having corresponding deformation constraints, to permit the model face to be stretched and move to attempt to align it with a subject image (i.e. input image or test image) A2. Equivalently, the list of predefined deformation parameters may be applied to subject image A2, and have it be moved and deformed to attempt to align it with model face A1. This alternate approach has the added benefit that as subject image A2 is being aligned with model face A1, it is simultaneously being fitted to the shape and size of model face A1. Thus, once alignment is complete, the fitted image is already in a preferred state for further processing.

For illustrative purposes, FIG. 3 shows model face A1 being fitted to subject face A2. The example of FIG. 3 is an exaggerated case for illustration purposes. It is to be understood that a typical model face A1 would have constraints regarding its permissible deformation points relative to other points within itself. For example, if aligning the model face meant moving its left eye up one inch and moving its right eye down one inch, then the resultant aligned image would likely not be a human face, and thus such a deformation would typically not be permissible.

In the example of FIG. 3, model face A1 is first placed roughly within the proximity of predefined points of interest, and typically placed near the center of subject face A2, as is illustrated in image A3. By comparing the amount of misalignment resulting from moving model face A1 in one direction or another, and the results of adjusting a size multiplier in any of several predefined directions, one can determine how to better align model face A1, as illustrated in image A4. An objective would be to align as closely as possible predefined landmarks, such as the pupils, nostril, mouth corners, etc., as illustrated in image A5. Eventually, after a sufficient number of such landmark points have been aligned, the subject image A2 is warped onto model image A1 resulting in a fitted image A6 of predefined shape and size with identified and labeled points of interest (such as outlines of eye features, nose features, mouth features, cheek structure, etc.) that can be further processed to achieve specific objectives.

This approach, however, does not take into account changes in appearance; such as for example, changes in shadow, color, or texture. A more holistic, or global, approach that jointly considers the object's shape and appearance is the Active Appearance Model (AAM). AAM searches for the best alignment of a model face (including both model shape parameters and model appearance parameters) onto a subject face while simultaneously minimizing misalignments in shape and appearance. In other words, AAM applies knowledge of the expected shapes of structures, their spatial relationships, and their gray-level appearance (or more generally color value appearance, such as RGB values) to restrict an automated system to plausible interpretations. Ideally, AAM is able to generate realistic images of sought objects. An example would be a model face capable of generating convincing images of any individual, such as by changing the individual's expression. AAM achieves this by formulating interpretation as a matching problem: given an image to interpret, structures are located and labeled by adjusting the model's parameters in such a way that it generates an "imagined image" that is as similar as possible to a plausible variation.

Figure 4:
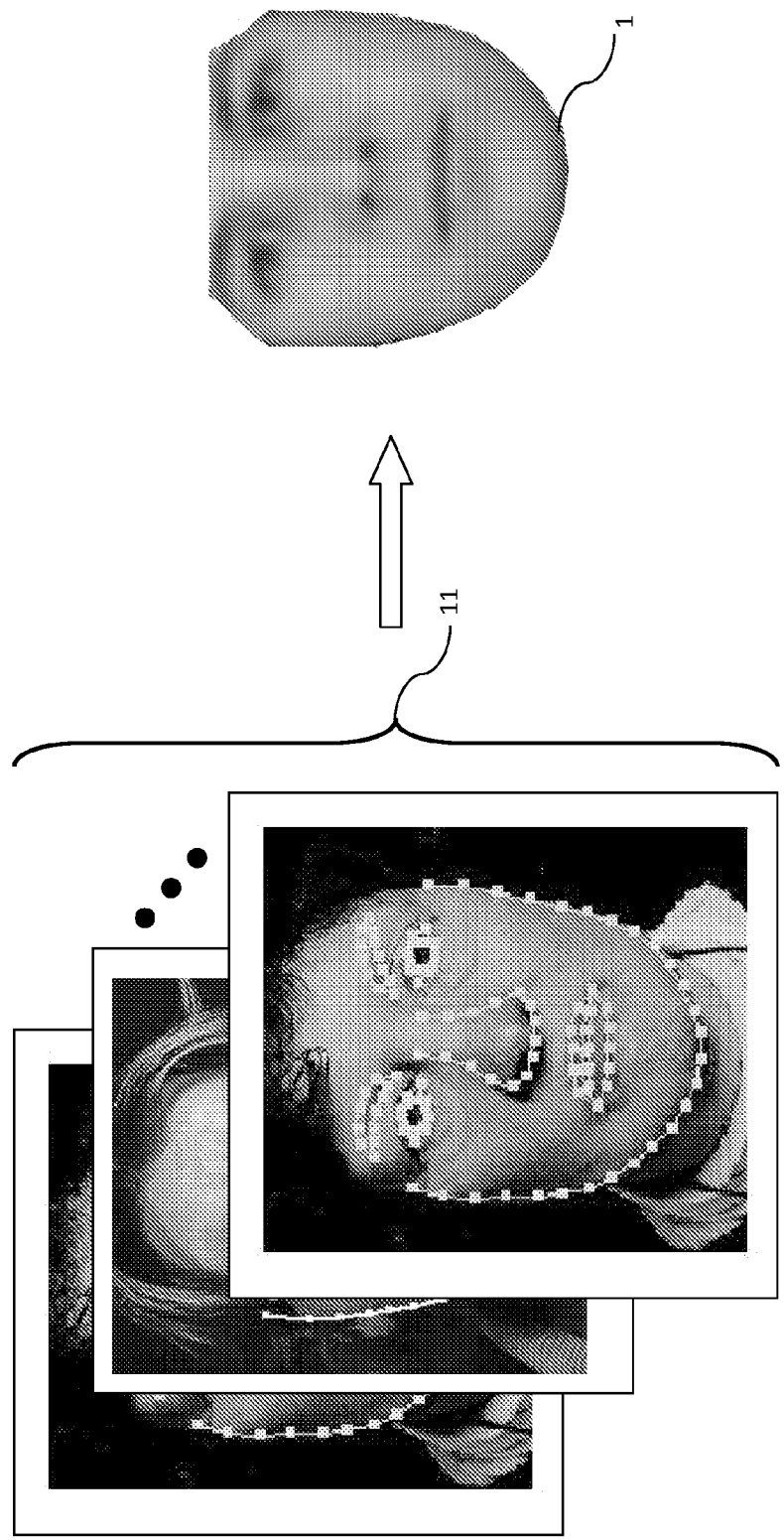
FIG. 4 illustrates the combining of a library of training images in the construction of a model face.

With reference to FIG. 4, a model face 1 may be constructed from a library of training images 11 (i.e. true faces images, in the present example). Typically, a user manually places "landmark" points on each training image to outline specific features characteristic to the class of object being represented. The landmark points are ideally selected in such a way that the landmark points outline distinguishable features within the class common to every training image. For instance, a common feature within a face class may be the eyes, and when building a model of the appearance of an eye in a face image, landmark points may be placed at the corners of the eye since these features would be easy to identify in each training image. In addition to the landmark points, however, AAM 25 also makes use of appearance data (i.e. shade data and/or color data and/or texture data, etc.) at various patches of each training image to create a distribution range of acceptable appearances for corresponding patches within model face 1. This appearance data constitutes additional features in the overall statistical analysis.

Figure 5:
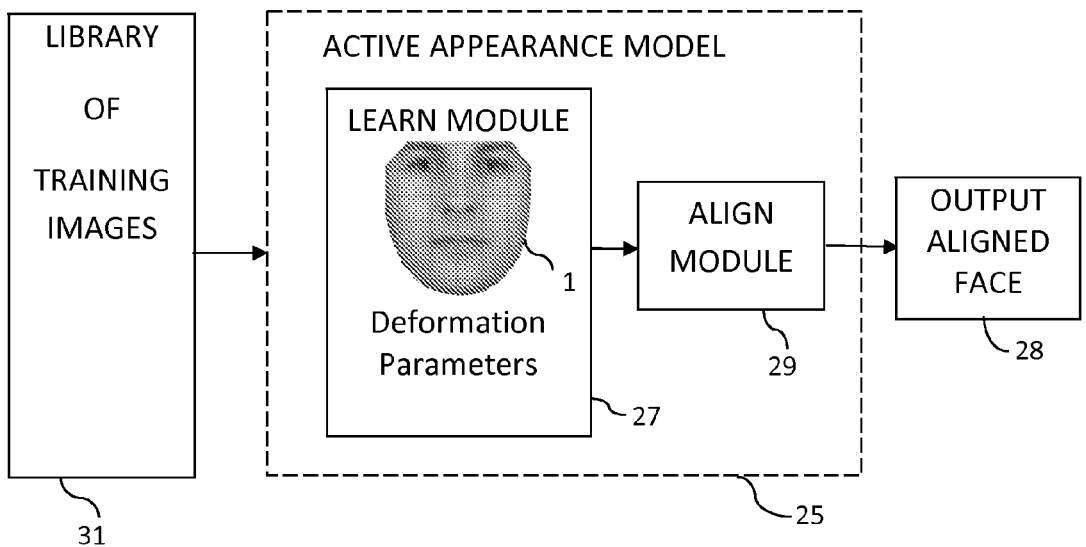
FIG. 5 illustrates the structure of an Active Appearance Model (AAM) machine with access to a training library of training images for training purposes.

With reference to FIG. 5, an active appearance model machine, AAM, 25 in the training phase would have access to a library 31 of training images, each being an example of a given class of object. In the present example, it is assumed that AAM 25 is being trained to identify a human face class, and thus library 31 would consist of a plurality of true face training images, each having landmark points outlining characteristic features of the human face class, such as training images 11 of FIG. 4. Library 31 may be housed in an internal and/or external memory store.

It is to be understood that AAM machine 25 may be embodied by a computing device and/or data processing device. As it is generally known in the art, such computing devices and data processing devices may include one or more central processing units, arithmetic units, registers, clocks, memories, input/output interfaces, GPU's, ASICs, PLA's, FPLAs, buses, bus interfaces, network connections, controllers, input/output devices, displays, etc.

AAM 25 includes a learn module 27 and an align module 29. Learn module 27 goes through library 31 and using statistical analysis, creates model face 1 by combining information from the face training images within library 31 and defines deformation parameters (i.e. variable feature parameters with defined constraints) for a statistical model fitting function defining shape and appearance features of model face 1. Preferably, the deformation parameters are such that they permit the shape and appearance of model face 1 to be warped enough to be aligned with a large percentage of the training images within library 31. In operation, align module 29 optimizes the model fitting function to attempt to fit (i.e. warp or align) model face 1 to a test (or input) face, not shown, and output the fitted face 28.

Align module 29 may also be used during the training phase as a way to test the results from learn module 27. In the training face, align module 29 may be used to attempt to warp model face 1 onto all the training images within library 31. This would provide a measure of the effectiveness of the model parameters produced by learn module 27. Typically, align module 29 may be successfully align model face 1 to only 90% to 95% of the training images within library 31.

Since align module 29 preferably adjusts the model face to align it with a test (or input) face, the resultant aligned face 28 is effectively a representation of the test image having been "warped" (or fitted) onto model face 1. Additionally, since the test face would have been fitted onto the model face, the resultant aligned face 28 would have the same, known size as model face 1, and have its various characteristic shape features (i.e. eyes, pupils, nose, mouth outline, chine, eyebrow, etc.) and appearance features labeled (and their locations identified), and is thus in an ideal state for further processing, if desired.

Figure 6:
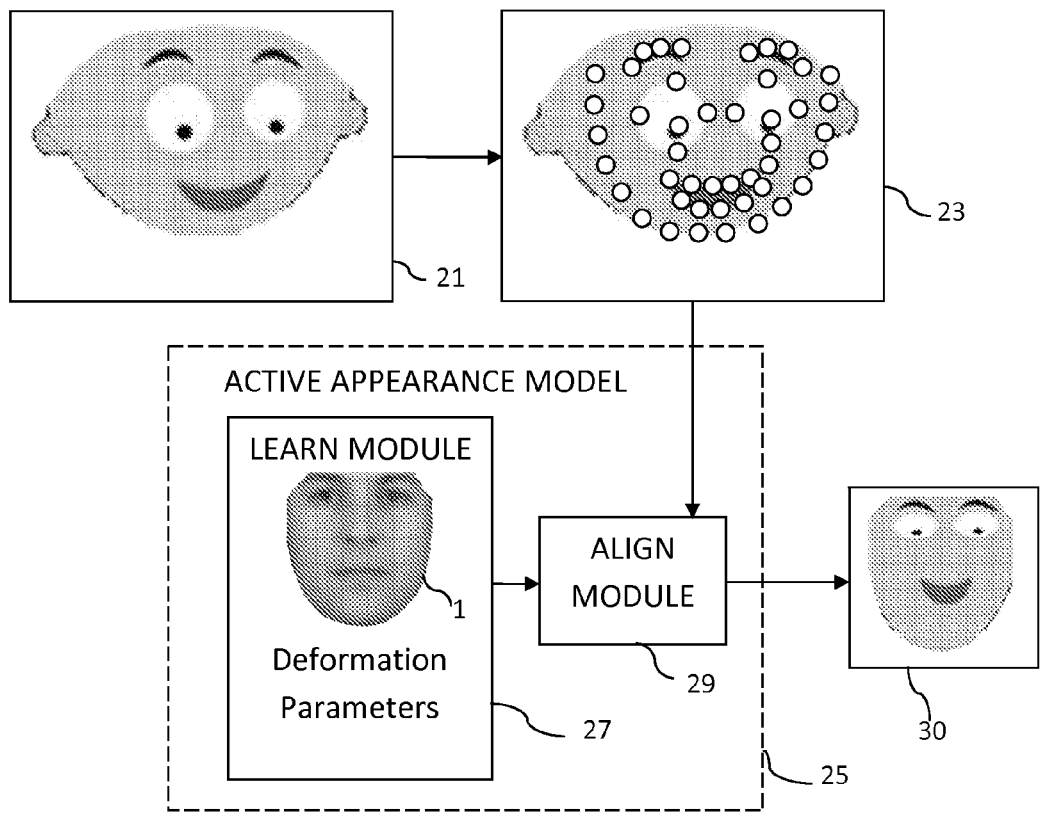
FIG. 6 illustrates an AAM during normal operation.

With reference to FIG. 6, where all elements similar to FIG. 5 have similar reference characters and are described above, the structure of a general AAM 25 in operation may exclude library 31. This is because the relevant image information from library 31 would have been captured by the statistical model (and model parameters) defined by learn module 27.

In operation, a new input image (or test image) 21 that is to be submitted to AAM 25 may optionally be preprocess to determined if an object within the class of objects AAM 25 is trained to recognize (i.e. a face in the present example) is indeed present within the input image 21. This may be achieved with face detection algorithms, as is generally known in the art. This process may also add at least a few landmark points at some of the more easily identifiable characteristic facial features within the input image to create a preprocessed image 23. Alignment module 29 would receive preprocessed image 23 (or alternatively input image 21) and optimize the model fitting function to attempt to align (i.e. warp or fit) model face 1 to preprocessed image 23, and output an aligned face 30. That is, alignment module 29 searches for the best alignment of model face 1 (including both shape and appearance parameters) onto the test image (i.e. input image 21 or preprocessed image 23) by simultaneously minimizing misalignments in shape and appearance.

Figure 7:
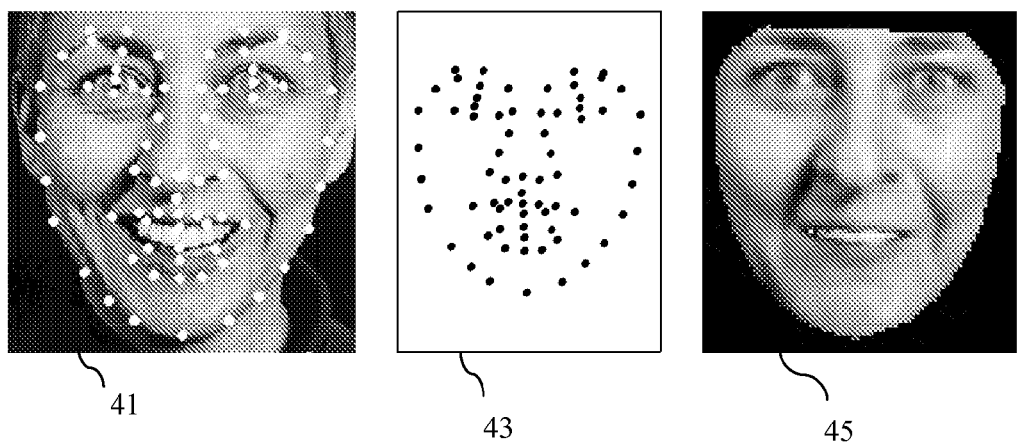
FIG. 7 illustrates an example of alignment of an input image to a model face.

An example of this type of alignment is illustrated in FIG. 7. A preprocessed image 41 is shown with various landmark points highlighting various characteristic features of a human face. Image 43 illustrates the landmark points alone, and image 45 illustrates the results of aligning a model face, not shown, onto image 41 as a result of alignment. Note that both shape and appearance features are aligned i.e., fitted.

Figure 8:
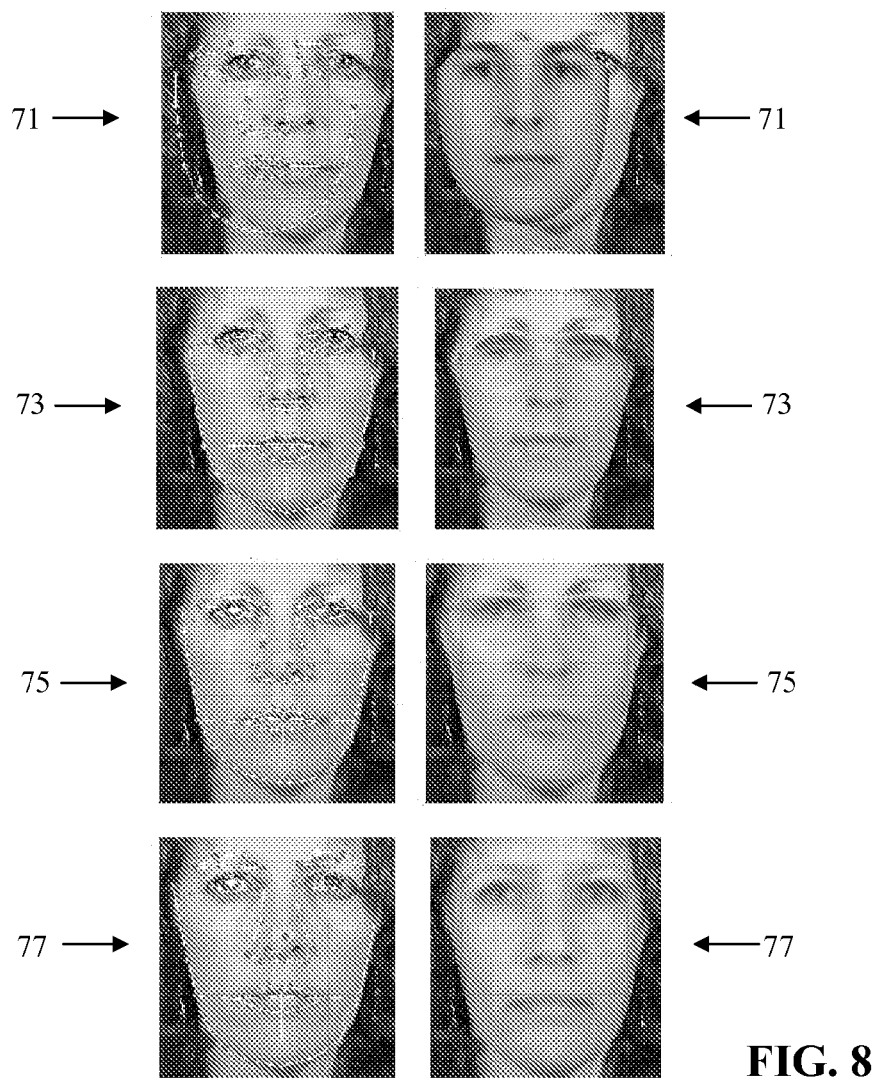
FIG. 8 illustrates some of the stages in an iterative process for aligning an input image to a model face.

As an additional example, four image pairs 71-77 illustrating various stages in an alignment process of a model face onto an input image are illustrated in FIG. 8. Within each image pair, the left image illustrates the model face shape alignment highlighted by landmark points, and the right image illustrates both the shape and appearance alignment of the model face onto the input image. Image pair 71 illustrates an initial position of the model face on the input image. Image pair 73 illustrates the result of an unconstrained AAM search. Image pair 75 shows the results of having the right eye center constrained, and image pair 77 shows the results of having the right eye center and left eyebrow fixed. As the error is minimized, the model face is better aligned to the input image, as illustrated by image pair 77.

Figure 9:
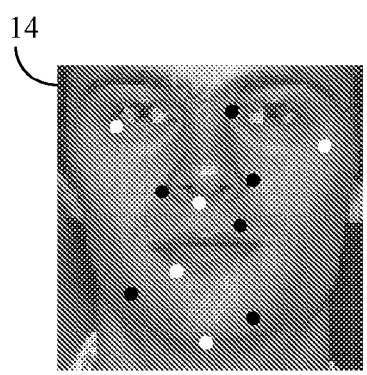
FIG. 9 illustrates the addition of some binary feature on the fitted face of FIG. 2.

Returning to FIG. 2, statistical analyses, such as provided by an AAM, is used to create fitted face 14. At this point, the present invention identifies image feature points within fitted face 14. A simplified representation of this is shown in FIG. 9, where a few feature points are illustrated as black and white dots. The feature points, along with their known relative position in the fitted face 14 are then used to match test image 12 to registered image within a collection of registered images. As is explained above, the subject of feature points is prominent in the field of feature based correspondence matching.

One example of a feature based correspondence matching algorithm is the scale-invariant feature transform, SIFT. The SIFT transform (or algorithm or process) identifies points of interest (or feature points or item descriptors) in a 2D image. A more detailed discussion of the SIFT transform is provided in U.S. Pat. No. 6,711,293 to Lowe, herein incorporated in its entirety by reference. Essentially, the SIFT transform uses a library of training images to identify feature points that are characteristic of a specific type of object (or item class). Once a library of the object's characteristic feature points have been identified, the feature points can be used to determine if an instance of the same type of object is found in a newly received image.

Principally, feature points (i.e. item descriptors) of the object item are extracted to provide a "feature description" of a specific object item. This description, typically extracted from training images, can then be used to identify the specific object item in a test image containing many object-types. To perform reliable recognition, it is preferred that the features extracted from the training images be detectable under changes in image scale, noise, illumination, and rotation. To reduce the contribution of the errors caused by local variations in the average error of all feature matching errors, SIFT typically detects and uses a large number of feature points from the images. Feature points usually lie near high-contrast regions of the image.

In a typical SIFT application, feature points of objects items are first extracted from a set of training images and stored in a database. An object is recognized in a new image by individually comparing each feature point from the new image to this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object item is computed, given the accuracy of fit and number of probable false matches. Object item matches that pass all these tests can be identified as correct.

Figure 10:
FIG. 10 illustrates the use of SIFT in the determination of feature points.

An example of a SIFT determination of feature points is illustrated in FIG. 10. Possible feature points are first identified, as indicated by dark dots in image 42. Since an objective of SIFT's algorithm is to identify similar feature points, or item descriptors, in two, or more, images, it is clear that each feature point needs to be highly distinguishable from all others. The feature points may be specific pixels, or image point segments, that are distinguishable based on their relation to surrounding pixels within a defined neighborhood region.

This is achieved by the large number of descriptive characteristics (or descriptive data) used to identify for each item descriptor. In a typical SIFT transform; each item descriptor is typically characterized by 128 pieces of descriptive data. Thus, although the SIFT item descriptors are here shown as darken dots, each darken dot may represent a 128-dimension vector. Some of the identified feature points are then eliminated. Typically, possible feature points that have a low contrast are discarded, as illustrate in image 33. Finally, possible features points located on edges are removed, which leaves the final set of feature points shown in image 35.

The preferred embodiment of the present invention, however, does not use SIFT feature points, or item descriptors, nor does it store a library of registered images. Rather, the present invention uses simple binary features, which are have parameters limited to one of two predefined values (typically a logic 1 or a logic 0), as item descriptors. As in the case of a SIFT feature point, a binary feature may be a multi-dimensional vector, but each dimensional value is limited to one of two values. Determination of the value can be based on a simple comparison of the parameter with given threshold or with a second point within the image. Since the binary feature has less information than a SIFT feature point, typically a large number of Binary feature points are needed to identify/distinguish an image.

One method of defining binary features is described in "ICA-based Binary Feature Construction", *Proc. of 6-th International Conference on Independent Component Analysis and Blind Source Separation* (ICA06), LNCS 3889, 2006, by Ata Kaban and Ella Bingham, which is herein incorporated in its entirety by reference. Like SIFT features, binary features may be identified along high contrast features of an image, i.e. edge lines, as is described in "Fast Binary Feature Selection with Conditional Mutual Information", *Journal of Machine Learning Research* 5 (2004), 1531-1555, by Francois Fleuret, which is herein incorporated in its entirety by reference. Another approach is to identify binary features randomly, as is described in "Fast Keypoint Recognition Using Random Ferns", *IEEE Transactions on Pattern Analysis and Machine Intelligence*, Vol. 32, 2010, by Mustafa Ozuysal, et al., with is herein incorporated in its entirety by reference.

Preferably, the present invention defines binary features by comparing various characteristic parameters of pairs of points (or pixel pairs) within an image. Within each compared characteristic parameter, one or the other of the two pixels within each pixel pair will have the greater value, and a corresponding binary value is assigned to that characteristic parameter based on the comparison result. Further preferably, the pixels that define each pixel pair (and thus the binary features) may be selected randomly within specified regions of the image being processed. That is, random pairs of pixel points within known regions of fitted face 14 are compared to produce binary features. Multiple pixel pairs may be selected for each defined region, forming a cluster, or set, of pixel pairs. Each cluster of pixel pairs within each defined region collectively constitutes a binary feature for that defined region. A defined region may have multiple clusters of pixel pairs defined within it, and each cluster constitutes a different binary feature for the defined region. Each cluster of pixel pairs thus provides a description of their corresponding region within an image, and not of the entire image. Consequently, fewer pixel pairs are need per image region, than would be required to describe the entire image. Furthermore, processing image regions, in turn, may be easier than processing the entire image as a whole.

When an input test image of someone wanting to be identified is received, binary features for corresponding predefined image regions are identified. Once identified, the binary features are compared with a data database that identifies probabilities of registered persons having similar binary features within the same specified image regions. The registered person with the highest cumulative probability is identified as matching the input test image. For ease of illustration, these known, specified image regions are hereinafter termed "patches".

Figure 11:
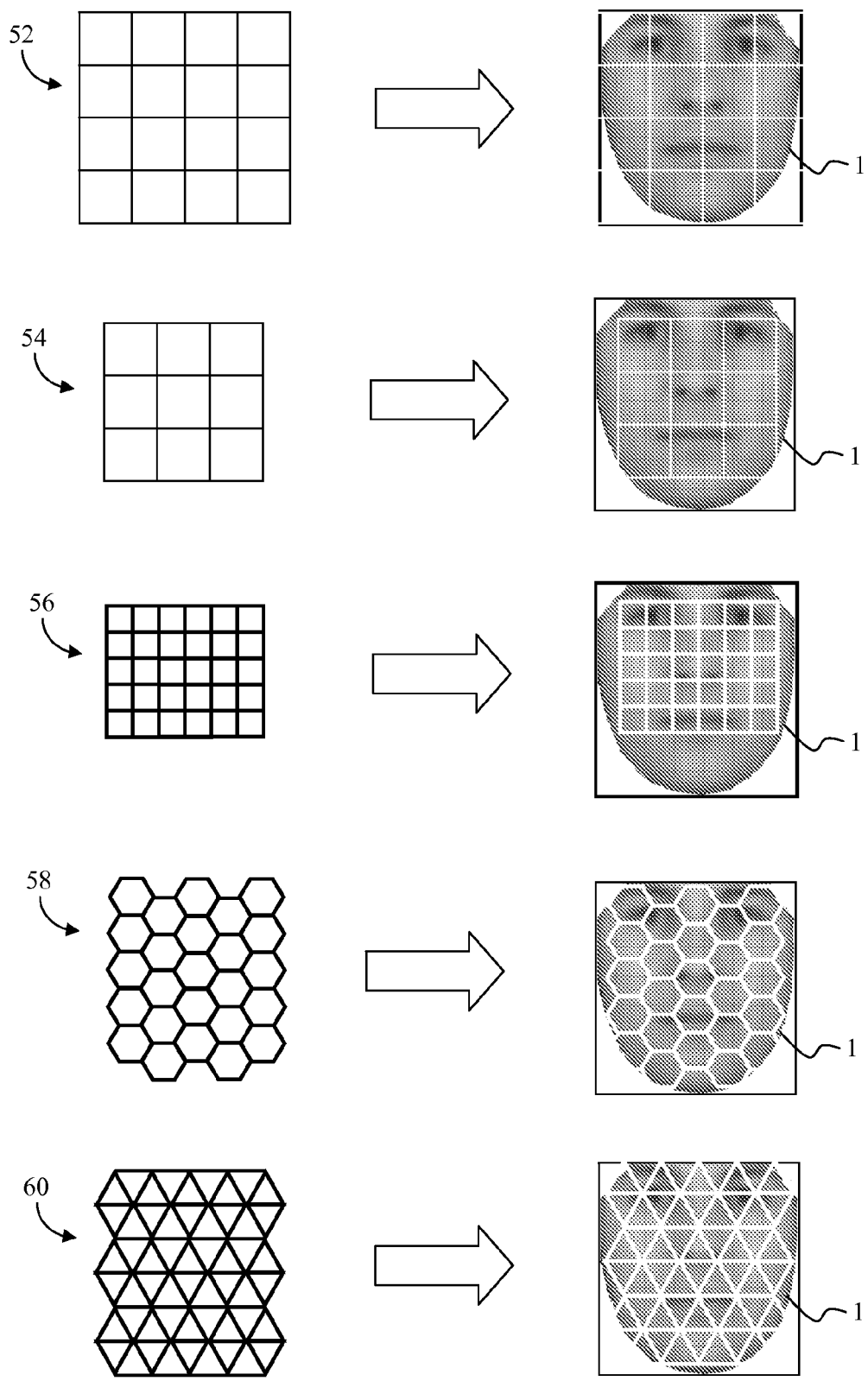
FIG. 11 shows examples of the defining of patches in accord the present invention.

An example of the defining of patches in accord the present invention is illustrated in FIG. 11. As is explained above, model face 1 would have been constructed from a library of training images, and is not representative of a registered person. Any of a number of patch patterns may be used. As shown, it is desirable that the patch patterns 52, 54, 56, 58, or 60 be constructed of cells that are of consistent/fixed shape and size (such as squares, hexagons, and/or triangles) and are uniformly distributed. The patch patterns are laid over model face 1 to define different patches of face 1 in the cells of the given patch pattern. Like in the case of patch pattern 52, the patch pattern may cover the entirety of an image (i.e. the entirety of model face 1). Alternatively like in the case of patch 54, a new patch pattern may be defined by reducing the number of cells of a larger patch pattern, but maintaining similarly sized and shaped cells, such as patch pattern 52. Further alternatively, a patch pattern may be smaller than the model face 1, as illustrated in patch pattern 56, but have smaller cells of similar shape so as to create a larger number of patches than patch pattern 52. In any case, it is presently preferred that which ever patter is used, that it be centered on model face 1. The image regions defined by the patches on model face 1 (i.e. canonical face) may be termed canonical feature patch locations.

As stated above, a cluster, or plurality, of random pixel pairs are preferably defined within each patch (or a select number of patches) of a given patch pattern. For example in FIG. 12, a single patch 62 is shown on model face 1 for illustration purposes. Further shown are larger views 62a, 62b, and 62c of patch 62. Each larger view has a deferent cluster (or set) of pixel pairs defining a binary feature. Each pixel pair is illustrated as black square paired with a corresponding a white square, to which it is linked to by a dark line. For example, each of larger views 62a, 62b, and 62c shows a different cluster of four pixel pairs, and each cluster of four pixel pairs defines a binary feature for that larger view. That is, four different binary features are defined for cluster 62, and each binary feature is illustrated in respective larger views 62a, 62b, and 62c. Thus, multiple distinguishing clusters of feature pairs may be defined for a given patch. For ease of discussion, each cluster of pixel pairs is hereinafter termed a "fern", such that each patch may be identified by a collection of ferns.

Figure 2:
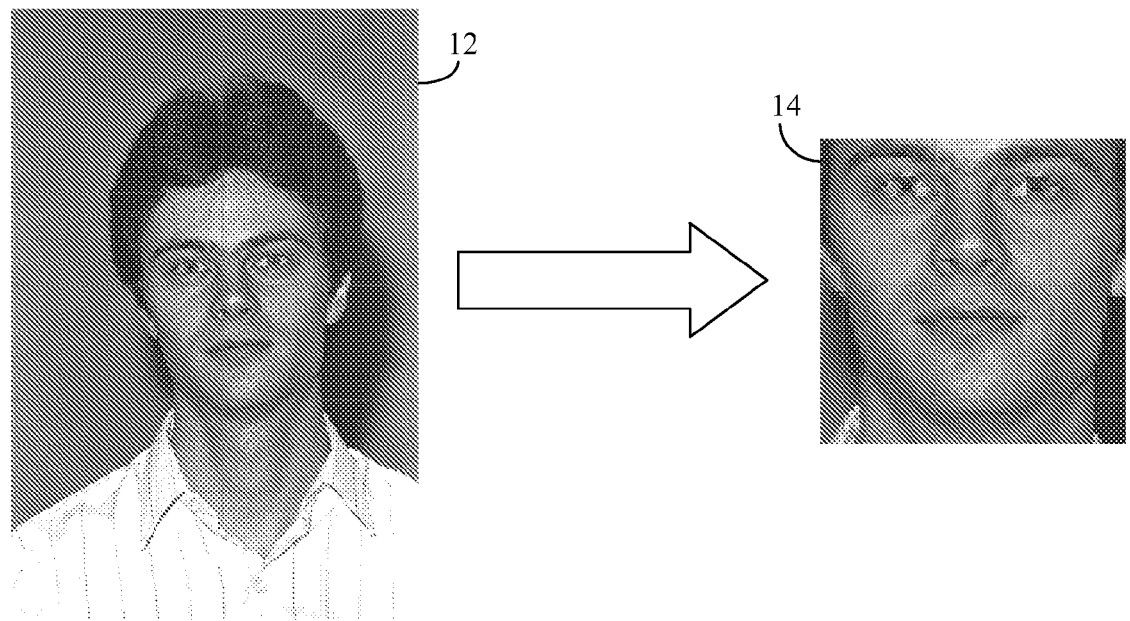
FIG. 2 illustrates the extraction of a fitted face from an input sample/test image.
Figure 13:
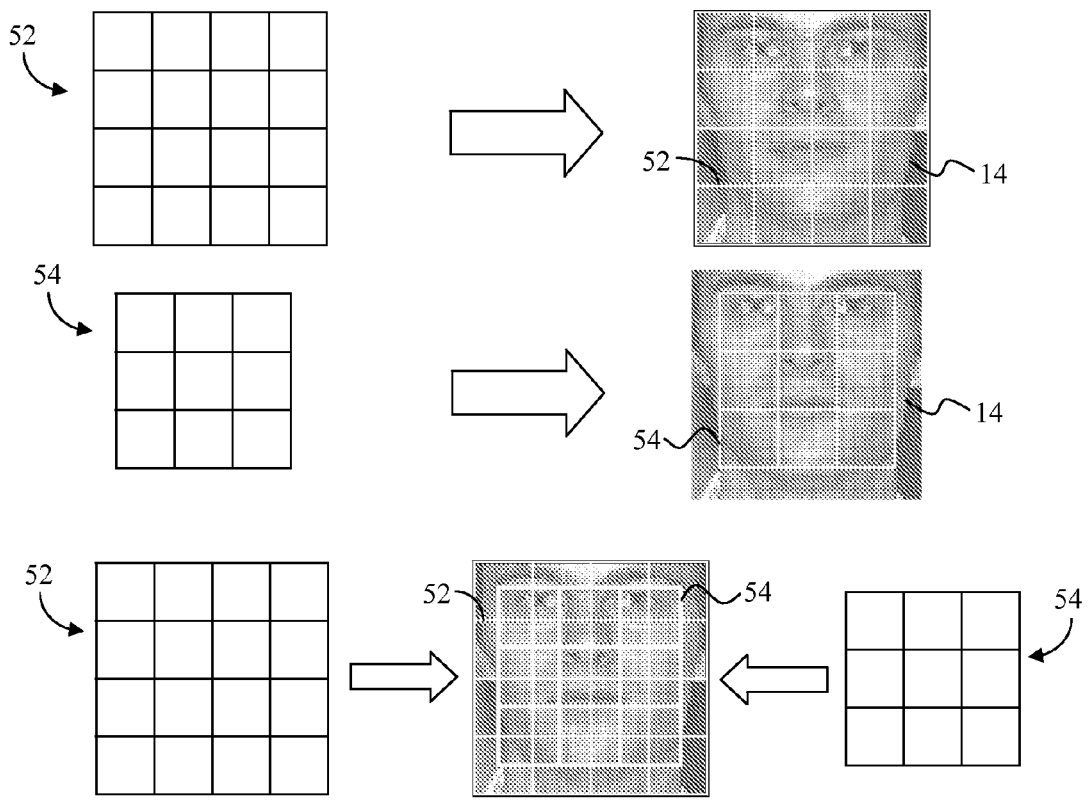
FIG. 13 illustrates the defining of overlapping patch patterns on a fitted face.
Figure 14:
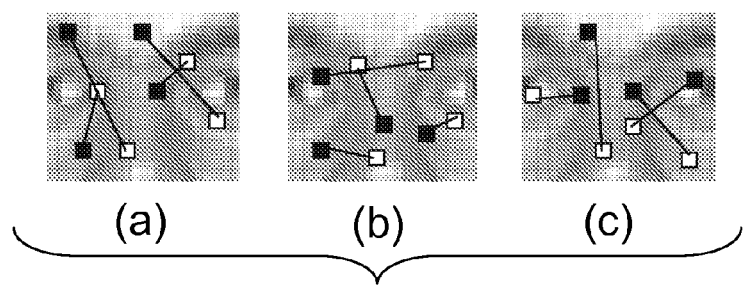
FIG. 14 illustrates one implementation of the defining of binary features within a patch.

The preferred process for extracting features (preferably binary features) from a submitted test image (either for registration or verification) is illustrated in FIGS. 2 and 13-14. As illustrated in FIG. 2, a submitted test image 12 is searched for the desired object class. In the present example, the desired object class is a human face, and so a face detector may optionally be used to confirm the existence of a face in submitted test image 12. The face(s) in test image 12 is then aligned/fitted to a model face (i.e. a canonical face), such as through the use of an AAM machine, for example to produce fitted face 14.

With reference to FIG. 13, once fitted face 14 is obtained, at least two different patch patterns previous defined on the canonical face 1 are used to define canonical feature patch locations within fitted face 14, each with a known location and size. For example, patch pattern 52 is laid over fitted face 14, forming a grid covering the entire fitted face 14. In the present example, patch pattern 54 is also laid over face 14. Although patch pattern 54 does not cover the entire face, the overlapping patches of patch pattern 52 and 54 do cover the entire face. Thus some segments of fitted image 14 are defined by overlapping ferns defined from overlapping patches within patch patterns 42 and 54.

Binary features are defined in each of the canonical feature patch locations. As before, the binary features may be based on randomly selected pixel pairs. Alternatively, the clusters of random pixel pairs (i.e. ferns) for each patch would have already been defined on the canonical image 1, as explained above in reference to FIGS. 11 and 12. A preferred embodiment uses the ferns defined on canonical image 1 in each of the overlapping canonical feature patch locations on fitted face 14.

Figure 12:
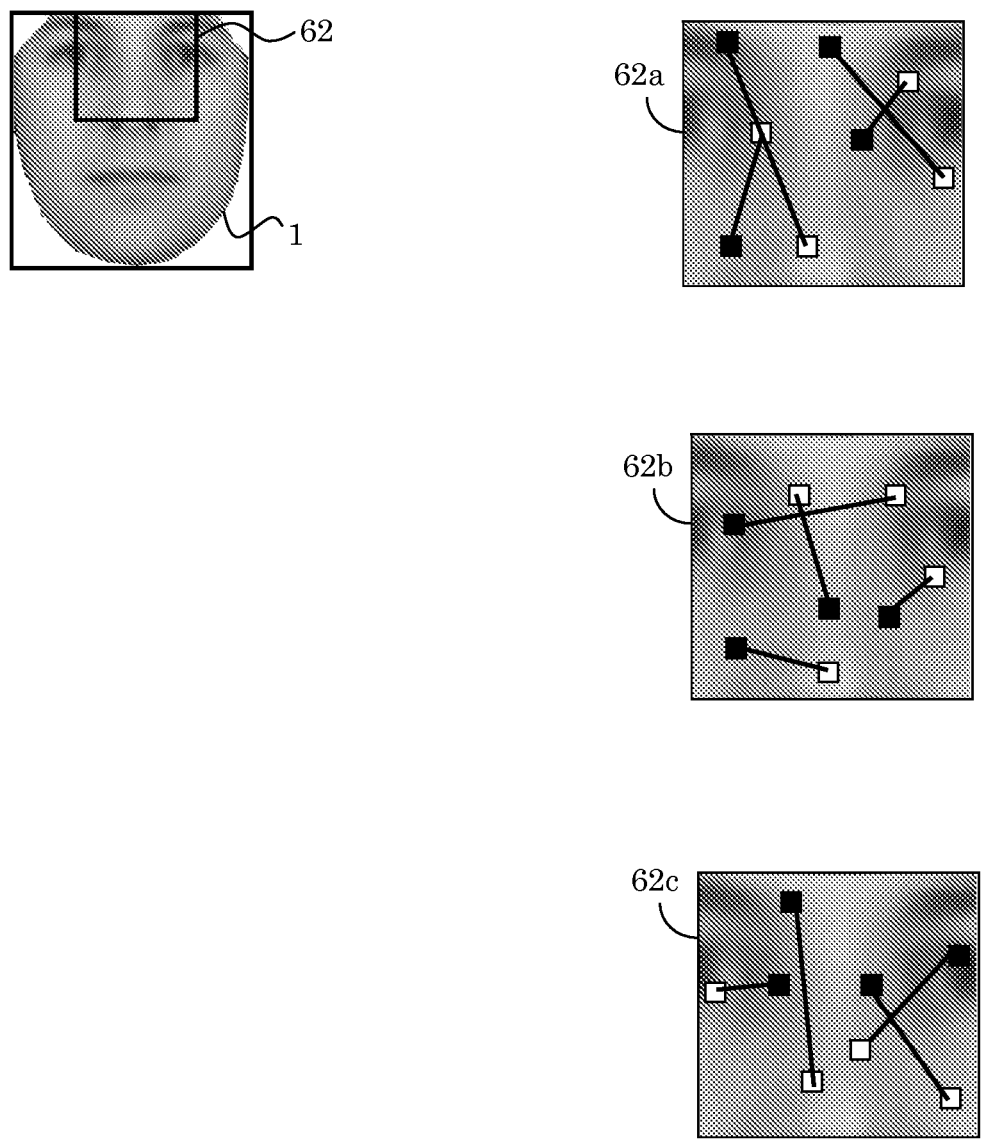
FIG. 12 illustrates the defining of clusters of random pixel pairs within a patch.

As an illustration with reference to FIG. 14, the ferns (i.e. the clusters of pixel pairs) defined on canonical feature patch 62 of FIG. 12 are used to identify binary features in a corresponding region of fitted face 14. In the present example, each of larger views 62a, 62b, and 62c defines a different/distinct binary feature identified as (a), (b) and (c), respectively. Additionally, each of the ferns defined by larger views 62a, 62b, and 62c are identified as ferns (1), (2), and (3), respectively. If patch 62 is identified as "k", then a first binary feature corresponding to ferns (1) of larger view 62a could be defined as Feature_a:[patch k] [fern 1] [bin 1], where the bin number identifies a specific characteristic feature of the pixel pair. Similarly, the binary feature corresponding to larger view 62b could be defined as Feature_b:[patch k] [fern 2] [bin 2], and the binary feature corresponding to larger view 62c could be defined as Feature_c:[patch k] [fern 3] [bin 3].

As is explained above, multiple (preferably two) patch patterns are overlapped over a submitted test image. Although the present invention uses much fewer binary features that typical, a high level of accuracy is maintained by directly comparing known, corresponding regions of a face (as determined by corresponding patches in common patch patterns), and by defining the binary features using overlapping patches, which provide more distinguishing information in a given area of the face.

Figure 15:
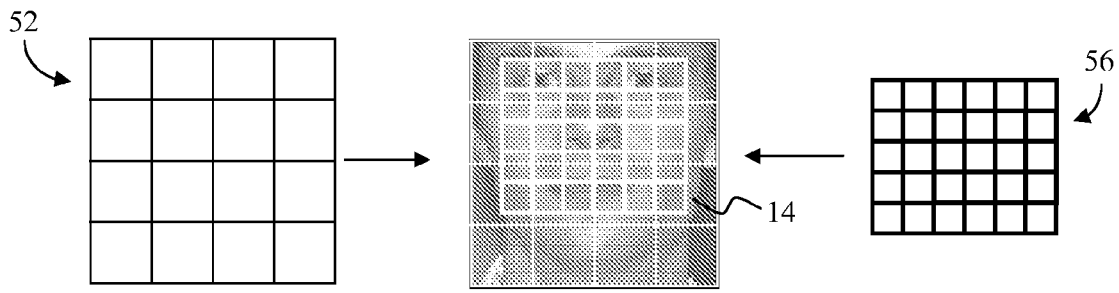
FIG. 15 provides additional illustrations of the defining of overlapping patch patterns on a fitted face.
Figure 15:
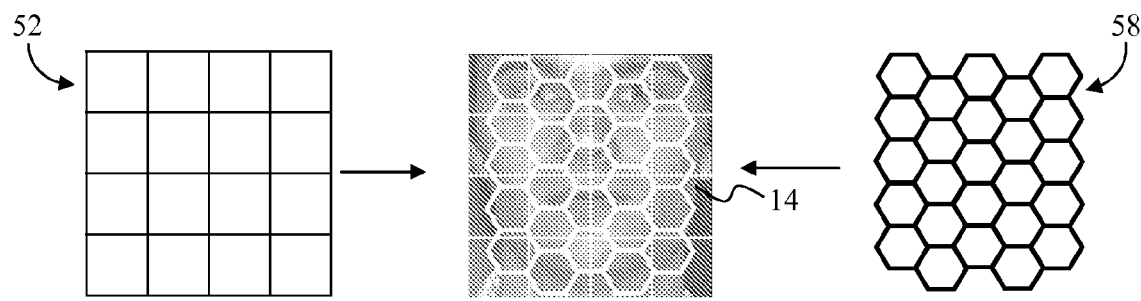
Figure 15:
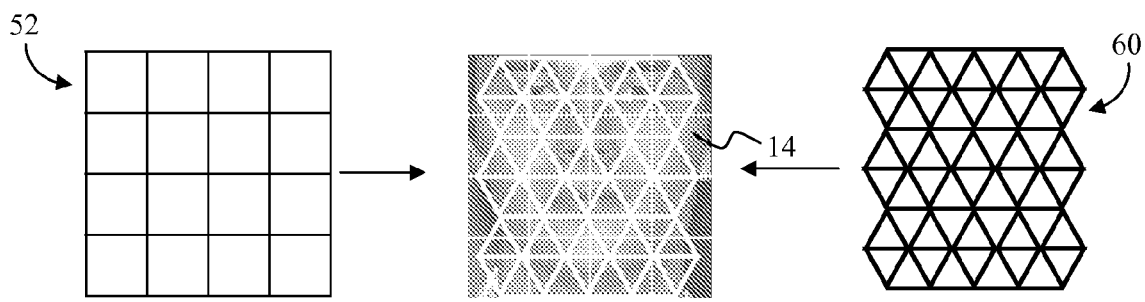

FIG. 15 illustrates multiple examples of overlapping patch pattern 52 with some of the patch patterns of FIG. 11. More specifically, patch pattern 52 is separately overlapped with patch pattern 56 on fitted face 14, with patch pattern 58 on fitted face 14, and with patch pattern 60 on fitted face 14. As is explained above, more than two of the patch patterns of FIG. 1 may be overlapped on fitted face 14.

As is stated above, the present invention may be divided into a registration phase and an identification/verification phase. The registration phase may also be termed a learn phase, in which faces of individuals being registered (i.e., individual faces that must later be recognized) are learned according to the present invention.

Figure 16:
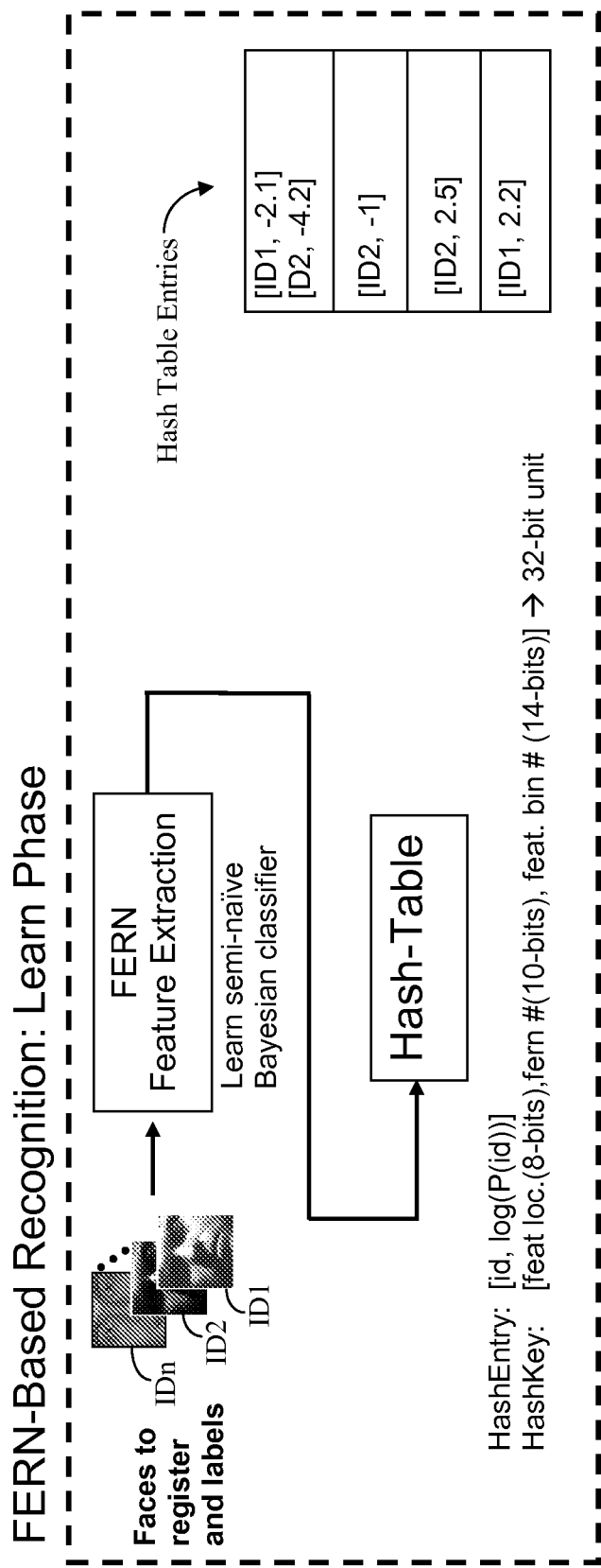
FIG. 16 is a block diagram illustrating the preferred learn phase of the present invention.
Figure 17:
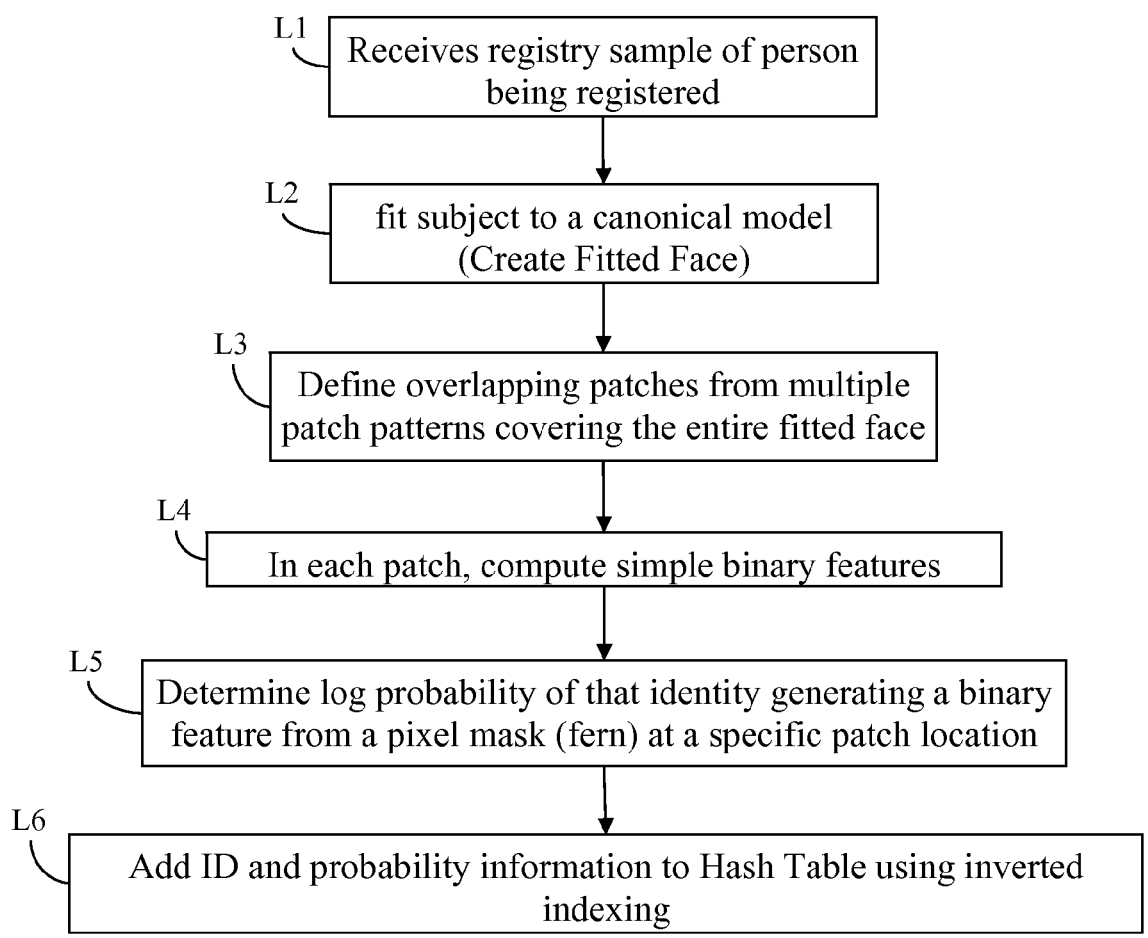
FIG. 17 is a flow chart of the preferred learn phase of the present invention.

With reference to FIGS. 16 and 17, the learn phase receives a registry sample of the person being registered (step L1). In the present example, each person being registered is associated with a photograph (i.e., portrait) of that person. As before, the face within the photograph is located and fitted to a canonical face/model (L2), resulting in a sample to be registered. In the present example, each register sample is identified with an identification (ID) code uniquely corresponding to the person associated with that photograph. Thus, samples ID1, ID2, . . . IDn have a one-to-one correspondence to n persons being registered. As described above, a first step is to define overlapping patches on a grid covering the entire face (L3), as illustrated in FIGS. 13 and 15.

In each patch, simple binary features are computed (L4), as illustrated in FIG. 14. As is explained above, a binary feature representative of a patch may be constructed by comparing pixel pair values at random locations within the patch. As illustrated in FIG. 16, collections of random pixel pairs, term ferns, may be used in the construction of a semi-naïve Bayesian classifier. As is also explained above, however, in the one embodiment of the present invention, the ferns may be constructed on the canonical face, and these constructed ferns then become fixed for the register samples and future verification samples. It is emphasized however, that any number of methods of constructing binary features may be used without deviating from the present invention.

Along with feature points, probability measures are determined (L5) indicative of the probability of the current individual being registered generating a binary feature from the pixel pair (or pixel mask, or fern) at the specific canonical patch location. As it would be understood, similar class objects, such as faces will have similar characteristics at somewhat similar locations, but will differ in specifics. Thus, this probability may be thought of as measure of how closely a fern within a patch within the register sample resembles the corresponding fern in the corresponding patch in the model face. Using a probability, however, further helps in comparing the similarities among the register samples. Further preferably, the probability is stored as a log probability to facilitate its use in future calculations.

The above information is preferably arranged using an inverted indexing scheme to hash the features i.e., to create a hash table (L6). The hash key is preferably based on patch location, feature (fern) number and feature descriptor (binary number), and the hash entry preferably contains identity information and corresponding log probability of that identity generating a binary feature from a pixel mask (fern) at a specific patch location.

More specifically, a hash key is used to find hash table entries. Each hash key is preferably a 32 bit unit, divided into segments identifying the feature location (8 bits), the fern number (10 bits), and the feature bin number (14 bits). Each hash entry contains identity information (i.e., ID1, ID2, etc.) identifying the person corresponding to the register sample to which the hash entry corresponds, and includes the determined corresponding log probability of that identity generating a binary feature from a pixel mask (fern) at a specific patch location.

After all the register samples of a person being registered have been entered into the hash-table, the validation, or search phase may begin. In this phase, a person wishing to be identified as being pre-registered submits a test image (i.e., portrait) of himself/herself. Equivalently if the present invention is being used in a general object recognition system, then the test sample would be a photograph/image containing the object being sought.

Figure 18:
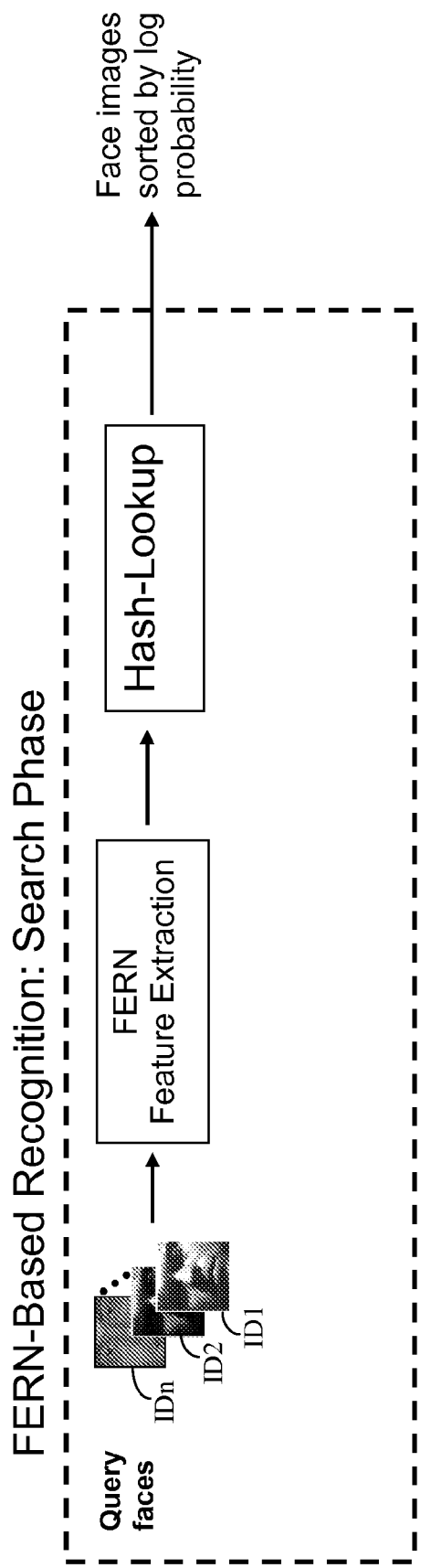
FIG. 18 is a block diagram illustrating the preferred search phase of the present invention.
Figure 19:
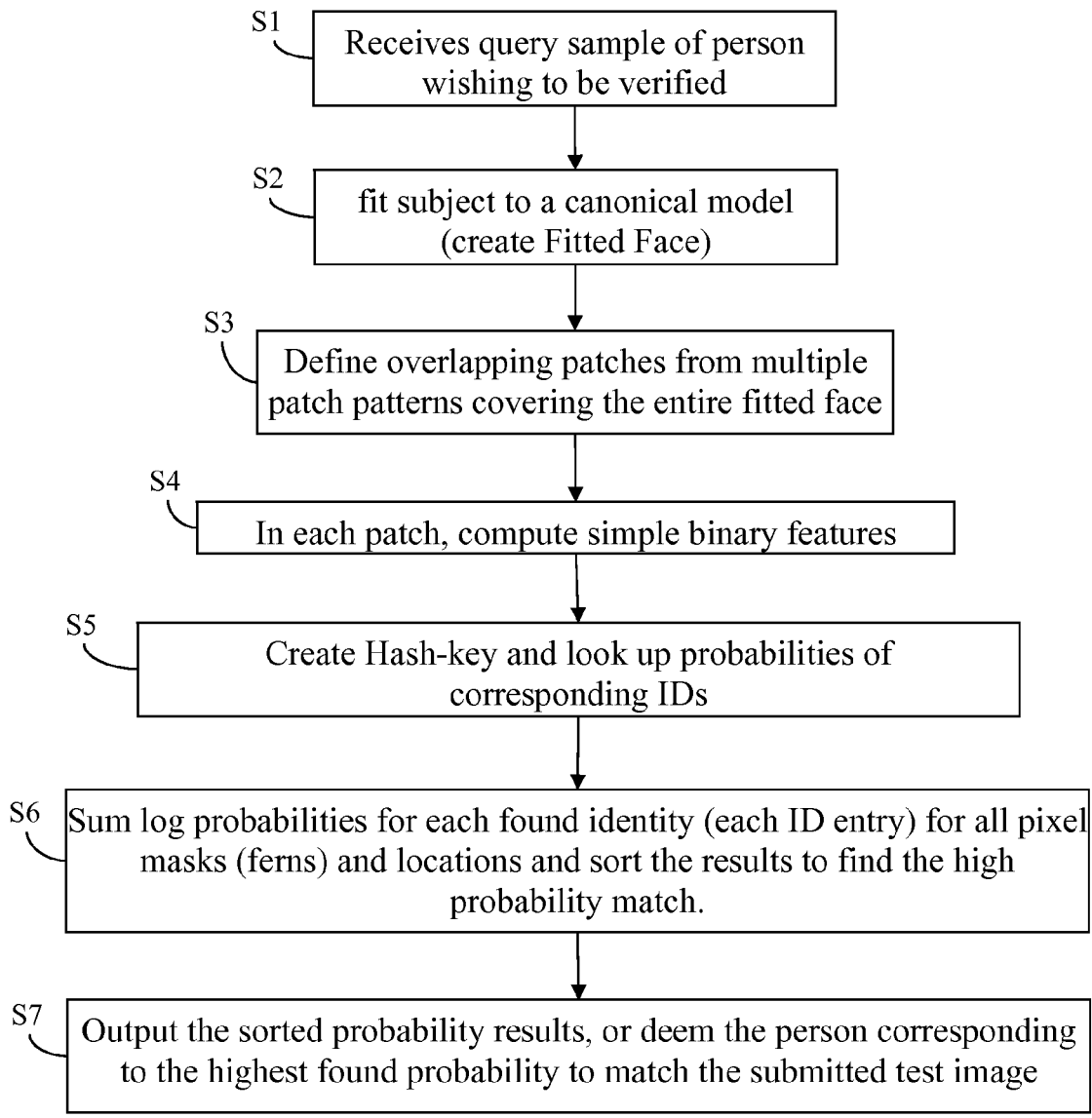
FIG. 19 is a flow chart of the preferred search phase of the present invention.

With reference to FIGS. 18 and 19, the initial steps in this search phase are similar to those of the learn phase. The search phase receives a test sample (i.e., query sample) of the person wishing to be identified (step S1). As before, the face within the photograph is located and fitted to a canonical face/model (S2), resulting in a fitted face to be queried. As described above, a first step is to define overlapping patches on a grid covering the entire face (S3), as illustrated in FIGS. 13 and 15.

In each patch, simple binary features are computed (S4), as illustrated in FIG. 14. As is explained above, a binary feature representative of a patch may be constructed by comparing pixel pair values at random locations within the patch. As illustrated in FIG. 16, collections of random pixel pairs (ferns), may be used in the construction of a semi-naïve Bayesian classifier. As is also explained above, however, in the one embodiment of the present invention, the ferns may be constructed on the canonical face, and these constructed ferns then become fixed for the query samples. It is emphasized however, that any number of methods of constructing binary features may be used without deviating from the present invention.

In contrast to the learn phase, the search phase does not calculate any probability measures, but uses the determined binary features to create hash keys and quickly look up probability values for the determined binary features (S5). Like before, the hash key is preferably a 32 bit unit, divided into segments identifying the feature location (8 bits), the fern number (10 bits), and the feature bin number (14 bits). This permits the present invention to quickly access a corresponding hash entry, as shown in FIG. 16. As explained above, each hash entry provides a person ID and his/her corresponding log probability of matching the current binary feature. The log probabilities for each found identity are summed for all pixel masks (ferns) and locations and sorted to find the high probability match. The sorted probability results may be outputted for further process, or the person corresponding to the highest found probability may be deemed to correspond to the submitted test image (S7).

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of identifying, within an input test image, a specific item of an item class, said method comprising:
   (a) identifying a sample of said item class within said input test image, and aligning the identified sample to a canonical sample of said item class to create a fitted sample;
   (b) applying a first patch pattern onto said fitted sample;
   (c) applying a second patch pattern onto said fitted sample, said second patch pattern overlapping said first patch pattern;
   (d) computing binary features for select overlapping patches of said first and second patch patterns, each computed binary feature being based on a choice of pixel patterns;
   (e) creating a different hash key for each computed binary feature, said hash key being based on patch location in which the binary feature was computed and the choice of pixel patterns used in its computation and the binary value of the computed binary feature;
   (f) using the created hash keys to access their corresponding entries in a hash table, each entry including identification (ID) information identifying an identity of a previously registered specific sample of said item class and the corresponding log probability of that identity generating a binary feature similar to the computed binary feature of the hash key at the specific patch location;
   (g) summing the log probabilities of each identity found in the hash table using the created hash keys, sorting the found identifies by cumulative log probabilities to find the highest probability match;
   (h) deeming the identity having the highest probability match to most closely match said specific item.

2. The method of claim 1, wherein in step (a), said fitted sample has a known size and shape.

3. The method of claim 1, wherein each patch within said first and second patch patterns has predefined pixel pair clusters for establishing said binary feature.

4. The method of claim 3, wherein the pixel pairs within said pixel pairs clusters are defined randomly on a corresponding patch on said canonical sample.

5. The method of claim 1, wherein each patch within said first and second patch patterns have randomly defined pixel pair clusters for establishing said binary feature.

6. The method of claim 1, wherein said first patch pattern fully spans said fitted sample, and said second patch pattern does not span the entirety of said fitted sample.

7. The method of claim 1, wherein in step (c), individual patches of said second patch pattern are misaligned with individual patches of said first patch pattern.

8. The method of claim 1, wherein in step (c), said first and second patch patterns have respective patches of uniform size and shape continuously distributed throughout their respective patch pattern.

9. The method of claim 8, wherein said second patch pattern is comprised of patches of identical shape and size as the patches of said first patch pattern.

10. The method of claim 8, wherein said second patch pattern has more patches than said first patch pattern, and the patches of said second patch pattern have the same shape as, and are smaller than, the patches of said first patch pattern.

11. The method of claim 8, wherein said second patch pattern is comprised of patches of different shape than the patches of said first patch pattern.

12. The method of claim 1, wherein in step (d), said choice of pixel patterns includes a random pixel pattern.

13. The method of claim 1, wherein in step (d), said choice of pixel patterns includes predefined pixel patterns defined randomly on said canonical sample.

14. The method of claim 1, wherein in step (d), each computed binary feature is further based on a choice of feature characteristics, and said choice of feature characteristics is implemented as direct comparisons between pixel pairs, defined by the choice of pixel patterns, of one of a plurality of pixel characteristics, wherein the binary value assigned to each pixel of the pixel pair is indicative of which pixel had the greater value and which had the lesser value in the comparison.

15. The method of claim 1, wherein binary features are computed for all patches of said first and second patch patterns.

16. The method of claim 1, wherein said hash table is constructed by
   (A) applying said first patch pattern onto said canonical sample;
   (B) applying said second patch pattern onto said canonical sample, said second patch pattern overlapping said first patch pattern;
   (C) defining a plurality of random pixel pair clusters for each patch in said first patch pattern and in said second patch pattern;
   (D) computing a separate binary feature for each pixel pair cluster;
   (E) defining said hash table using an inverted indexing scheme, wherein a hash key is computed for each computed binary feature based on the patch location in which the binary feature was computed and the pair cluster used in its computation and the binary value of the computed binary feature;

(F) accessing a library of registrable samples of said item class, each registrable samples having a defined ID information identifying its identity, for each accessed registrable sample:

(i) aligning the registrable sample to said canonical sample to create a registrable fitted sample;

(ii) applying said first patch pattern onto said registrable fitted sample;

(iii) applying said second patch pattern onto said fitted sample, said second patch pattern overlapping said first patch pattern;

(iv) computing a separate binary feature for each of the random pixel pair clusters defined in step (C);

(vi) computing a probability of the current registrable sample generating a binary feature from the pixel pair cluster at the current specific patch location;

(vii) storing said probability and the identify of the current registrable sample at the hash table location corresponding to the current binary feature.

17. The method of claim 16, wherein said probability is a log probability.

18. The method of claim 1, wherein said item class is a human face class.

* * * * *